Patented Oct. 31, 1950

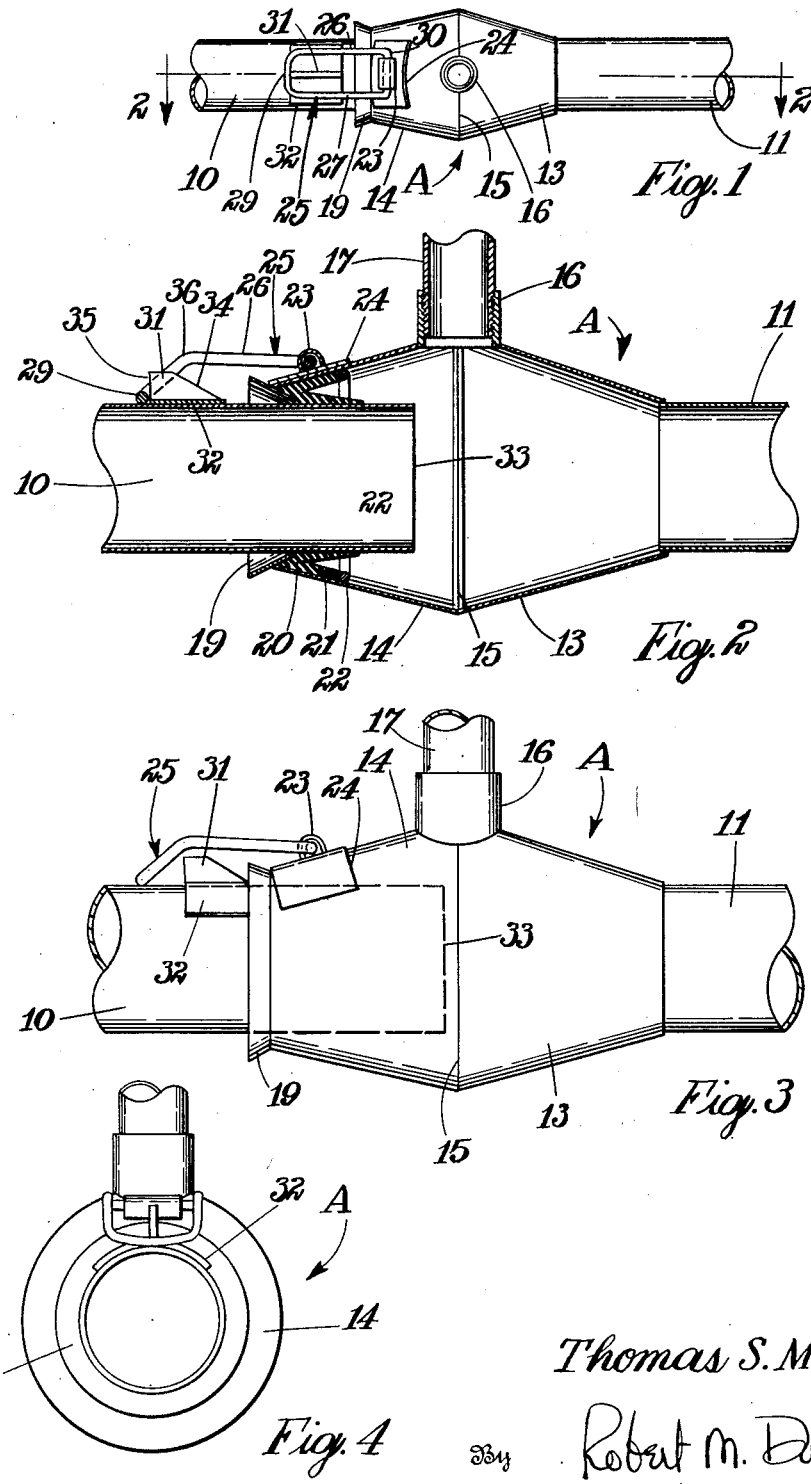

2,527,644

UNITED STATES PATENT OFFICE 2,527,644

COUPLING

Thomas S. Moulton, Stillwater, Minn.

Application May 16, 1946, Serial No. 670,121

4 Claims. (Cl. 285—170)

My invention relates to an improvement in couplers, wherein it is desired to provide a coupling which may be quickly attached and detached.

In recent years many irrigation systems have been provided to pump water from a stream or other source of water supply for use in irrigating land. The position of the tubing through which the water is pumped must be changed at frequent intervals in order to properly distribute the water over a cultivated area. As a result various types of couplers which may be readily attached and detached and which permit angularity between pipe sections have been produced. Most of these couplers may be engaged either by a relative sliding movement or a combination sliding movement and rotary movement. Many couplers are somewhat difficult and unhandy to use.

It is the object of the present invention to produce a coupler which may be attached and detached with a minimum of effort.

A feature of the present invention resides in the provision of a coupler which may connect two sections of pipe by means of a longitudinal sliding movement. As a result by merely forcing the two pipe sections into telescoping relation the sections are locked from separation.

A further feature of the present invention lies in the provision of a connection which may be detached by a relative rotary movement between the sections. By rotating one section relative to the other the locking means can be disengaged to permit the two sections to be separated.

A feature of the present invention lies in the provision of a locking means which may be actuated from a distance. The locking means itself need not be handled either during the attaching process or the detaching process.

A further feature of the present invention lies in the provision of a cam shaped wedge member on one section which is engageable with a pivotal loop or bail on the other section. The loop or bail is so designed that in locking position the two sections are held from separation as well as from any considerable relative rotation. However, in a second position of the two sections the wedge shaped element may be pivoted out of engagement with the loop or bail.

A further feature of the present invention lies in the provision of a means of reinforcing the locking apparatus to prevent strain on the locking apparatus from injuring the pipe sections.

These and other objects and novel features of my invention will be more clearly and fully set forth in the following specification and claims.

In the drawings forming a part of my specification:

Figure 1 is a top plan view of my coupler showing the construction thereof.

Figure 2 is a sectional view through the coupler of Figure 1, the position of the section being indicated by the line 2—2 of Figure 1.

Figure 3 is a side elevational view of the coupler.

Figure 4 is an end elevational view of the coupler.

The coupler A is designed to receive the end of an adjacent length of pipe. Accordingly pipe sections are ordinarily formed with a coupler A on one end thereof and a cooperable means at its other end which is engageable with a similar coupler of another pipe section. For the purpose of convenience the two pipe sections illustrated are designated 10 and 11. Actually, however, the sections 10 and 11 may if desired be identical.

The pipe sections such as 11 are welded or otherwise attached to the frustro-conical coupling body member 13, the pipe 11 being secured to the small diameter end of the coupling section 13. A second frustro-conical coupling section 14 is secured in opposed relation to the section 13 and the large diameter ends of the sections 13 and 14 are welded together at 15. A nipple 16 is usually welded with the coupling sections 13 and 14 at the joint 15 to project at substantially right angles to the axis of these sections. The nipple 16 is internally threaded to accommodate a riser pipe 17 which may be provided at its upper extremity with a sprinkler head, not illustrated in the drawings.

The small diameter end of the coupler section 14 is connected to a relatively short frustro-conical section 19, the connection with the section 14 being preferably between the ends of the frustro-conical collar 19. The collar 19 is provided to assist in maintaining the gasket 20 in place and also to guide the end of the adjacent section 10 into position within the coupler.

The gasket 20 is substantially V-shaped in cross section having an outer inclined wall 21 designed to lie against the inner surface of the coupler section 14 and having its other wall 22 inclined inwardly to engage the outer surface of the pipe section 10. The gasket 20 is held in place between the collar 19 and a retaining ring 22 welded or otherwise affixed to the inner surface of the section 14.

A loop 23 is terminally welded or otherwise affixed to a curved reinforcing plate 24. The plate 24 is welded or otherwise secured to the outer surface of the coupler section 14. The loop 23 is preferably arranged with its center on a plane through the axis of the coupler and through the axis of the nipple 16, so that the loop 23 is mounted on the top of the coupler.

An elongated loop or bail 25 extends through the loop 23 and is pivotally supported thereby. This loop or bail is provided with parallel opposed ends 25, 26 and 27 and a curved end 29. The end of the bail 29 is curved so that its inner surface is on the arc of a circle having as its center a point substantially above the mid-point of the gasket 20. As a result the end 29 of the bail 25 will not bind on its lug to which it is connected regardless of the angularity between two adjacent sections.

The ends 26 and 27 of the loop 25 may be bent inwardly into abutting relation and may be secured together or may be in spaced relation. In other words, the loop 25 may comprise a complete loop or may be open slightly at the pivoted end 30.

A lug 31 is welded or otherwise affixed to extend radially from a curved reinforcing plate 32 which is curved to fit the curvature of the exterior of the pipe section 10. The reinforcing plate 32 is welded or otherwise affixed to the pipe 10 near the end of this pipe, but spaced therefrom. As a result the lug or wedge 31 may be in engagement with the loop or bail 25 when the end 33 of the pipe section 10 is enclosed within the coupler A.

The lug 31 is provided with an inclined edge 34 inclined toward the end 33 of the pipe section 11. This inclined surface 34 may act as a cam to raise the loop or bail 25 as the pipe section 10 is inserted into the coupler A. The side 35 of the lug 31 most remote from the pipe end 33 is substantially right angular to the surface of the pipe or overhangs slightly to securely engage the curved end 29 of the bail 25.

As best illustrated in Figures 2 and 3 of the drawings the sides 26 and 27 of the bail 25 are bent at 36 so as to space the major portion of the sides 26 and 27 away from the surface of the pipe section 10. Thus when the pipe section 10 is in the position illustrated in Figures 1 and 2 of the drawings the section 10 can not be pulled away from the coupler due to its engagement with the shoulder end 35 of the lug 31. However, when the pipe section 10 is pushed into the coupler as illustrated in Figure 3 of the drawings the lug 31 clears the bail 25 and the pipe section 10 may be rotated relative to the pipe section 11. Upon rotation until the lug 31 is out of alignment with the bail 25, the pipe section 10 may be withdrawn from the coupler A.

In operation the pipe sections are usually positioned with the end 23 acting as the intake of the sections and the coupler being located at the outlet end. As a result the end 33 of the section 10 may be inserted into the coupler A, the cam surface 34 raising the bail or loop 25 until the movement is sufficient to permit the end 29 of the bail to drop over the shoulder 35 of the lug 31. In this position, as shown in Figures 1 and 2, the two sections can not be operated by a longitudinal movement.

When it is desired to separate the two sections the section 10 may be forced into the coupler A to the position shown in Figure 3 of the drawings. The pipe section 10 may then be rotated until the lug 31 is out of alignment with the bail 25 whereupon the two sections may be separated.

In accordance with the patent statutes, I have described the principles of construction and operation of my coupler, and while I have endeavored to set forth the best embodiment thereof, I desire to have it understood that obvious changes may be made within the scope of the following claims without departing from the spirit of my invention.

I claim:

1. A coupler for coupling two pipe sections together, one of said sections having a coupler body on one end thereof into which an end of the other section may be inserted, a bearing on said coupler body, a loop pivotally supported in said bearing and extendable beyond the end of said coupler body, said loop having a closed end thereupon designed to contact the pipe section engaged in said coupler, said loop being formed to space the major portion thereof away from the pipe engaged in said coupler, and a lug on said section engaged in said coupler, said lug being engaged with said closed end of said loop when said lug is against said closed end and being movable beneath said loop when spaced from said closed end and while said closed loop end contacts the pipe section engaged in the coupler.

2. A coupler for connecting two pipe sections in telescoping relation, one of said pipe sections slidably receiving the other of said pipe sections, a bearing on said one pipe section near the telescoping end thereof, a loop pivotally supported in said bearing and projecting beyond said end, said loop being formed to extend generally parallel to said other pipe section throughout a portion of its length and to incline toward said other section throughout the remaining portion of its length, the free end of said loop engaging the surface of said other section, a lug on said other section engageable with the free end of said loop, said loop preventing separation between said sections and continuous rotation between said sections when thus engaged, said lug being sufficiently short to move beneath said parallel portion of said loop when said sections are telescoped a greater amount.

3. A coupler for two telescoping pipe sections, a loop pivotally secured to one section to project beyond the telescoping end thereof, a lug on the other of said sections having a shoulder thereon engageable with the free end of said loop in one relative position of said sections, the pivoted end of said loop being spaced from said other section when the free end of the loop rests upon the other section and is engaged with said lug, said lug being pivotal beneath said loop in another relative position of said sections while the free end of the loop rests upon said other section.

4. A coupler for two pipe sections arranged in telescoping relation, one of said sections having a loop pivoted thereto to extend beyond the telescoping end thereof, said loop being bent toward the axis of said sections intermediate the ends of the loop, a lug on the other section, said lug having a shoulder engageable with the free end of said loop to prevent separation between said sections in one relative position between said sections and having a cam surface thereupon for pivoting said loop as said sections are telescoped together, said lug being movable beneath said loop in another relative position of said sections while the free end of the loop rests upon said other section.

THOMAS S. MOULTON.

REFERENCES CITED

The following references are of record in the file of this patent:

UNITED STATES PATENTS

| Number | Name | Date |
|---|---|---|
| 721,985 | Wells | Mar. 3, 1903 |
| 2,251,651 | Ames et al. | Aug. 5, 1941 |